US009537397B2

(12) United States Patent
Nishimura (10) Patent No.: US 9,537,397 B2
(45) Date of Patent: Jan. 3, 2017

(54) CONVERTER (71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventor: Tsuguo Nishimura, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LIMITED, Osaka (JP)

( * ) Notice: Subject to any disclaimer, the term of this patent is extended or adjusted under 35 U.S.C. 154(b) by 0 days.

(21) Appl. No.: 14/782,477

(22) PCT Filed: Mar. 13, 2014

(86) PCT No.: PCT/JP2014/001418
§ 371 (c)(1),
(2) Date: Oct. 5, 2015

(87) PCT Pub. No.: WO2014/171058
PCT Pub. Date: Oct. 23, 2014

(65) Prior Publication Data
US 2016/0043641 A1 Feb. 11, 2016

(30) Foreign Application Priority Data
Apr. 19, 2013 (JP) ................................. 2013-088607

(51) Int. Cl.
G05F 1/00 (2006.01)
H02M 3/158 (2006.01)
(Continued)

(52) U.S. Cl.
CPC ............... *H02M 3/158* (2013.01); *H02M 1/08* (2013.01); *H02M 3/1582* (2013.01); *H02M 1/38* (2013.01);
(Continued)

(58) Field of Classification Search
CPC .. H02M 3/158; H02M 3/1588; H02M 3/1582; H02M 2001/0045; H02M 2001/0067
(Continued)

(56) References Cited

U.S. PATENT DOCUMENTS 6,765,371 B2 * 7/2004 Kataoka ............. H02M 3/1582
323/222
2008/0203990 A1  8/2008 Nishida
2011/0074356 A1  3/2011 Yamazaki et al.

FOREIGN PATENT DOCUMENTS

EP  1 289 106 A1  3/2003
EP  2 071 714 A1  6/2009
JP  2012-205427 A  10/2012

OTHER PUBLICATIONS

Jul. 30, 2014 International Search Report issued in International Application No. PCT/JP2014/001418.
(Continued)

*Primary Examiner* — Adolf Berhane
*Assistant Examiner* — Afework Demisse
(74) *Attorney, Agent, or Firm* — Oliff PLC (57) ABSTRACT A converter having an inductor, a first switch, a second switch, a third switch, and a fourth switch connected between the other ends of the inductor and the second switch. The converter is adapted to turn ON/OFF individually the first switch, the second switch, the third switch and the fourth switch so as to convert a voltage applied between the other ends of the first switch and the second switch. Also included is a diode, a maintaining device and a release device. The generating device generates small/large output
(Continued)

electric current in correspondence with high/low of a voltage of a connection node between the semiconductor transistor and the resistor, and increases the output electric current by switching a voltage applied on the third end from a first voltage to a second voltage lower than the first voltage.

8 Claims, 6 Drawing Sheets

(51) Int. Cl.
*H02M 1/08* (2006.01)
*H02M 1/38* (2007.01)
*H02M 1/00* (2006.01)

(52) U.S. Cl.
CPC ... *H02M 2001/0048* (2013.01); *Y02B 70/1491* (2013.01)

(58) Field of Classification Search
USPC .......................................................... 323/271
See application file for complete search history.

(56) References Cited

OTHER PUBLICATIONS

Jul. 2, 2015 International Preliminary Report on Patentability issued in International Patent Application No. PCT/JP2014/001418.

* cited by examiner

Fig. 6

CONVERTER

The present application is a national stage of PCT/JP2014/001418, filed on Mar. 13, 2014, which claims priority to JP 2013-088607, filed on Apr. 19, 2013. The disclosures of each are hereby incorporated by reference in their entireties.

BACKGROUND

The present invention relates to a converter stepping up and down an applied voltage so as to convert the voltage.

Presently, some vehicles incorporate a storage battery in addition to a battery. Such a vehicle incorporates a converter stepping up and down the output voltage of the battery so as to convert the output voltage and then applying the converted voltage on the storage battery.

Such a converter may include an inductor, a first switch and a second switch, one end of each of which is connected to one end of the inductor, a third switch, one end of which is connected to the other end of the inductor, and a fourth switch, one end and the other end of which are connected respectively to the other ends of the inductor and the second switch, and turning ON/OFF individually the first switch, the second switch, the third switch and the fourth switch so as to convert a voltage between the other ends of the first switch and the second switch.

In such a converter, a battery is connected between the other ends of the first switch and the second switch and a storage battery is connected between the other ends of the third switch and the fourth switch. Then, the first switch, the second switch, the third switch, and the fourth switch are turned ON/OFF individually so that the output voltage of the battery is converted. Then, the converted voltage is outputted to the storage battery.

When the output voltage of the battery is to be stepped down, in a state that the third switch and the fourth switch are maintained at ON and OFF respectively, transition is made alternately between a state that the first switch and the second switch are ON and OFF and a state that the first switch and the second switch are OFF and ON.

Here, when the second switch is turned ON for the purpose of stepping down the output voltage of the battery, a possibility arises that an electric current flows from the storage battery, that is, from the output side of the voltage, to the inductor so that the output voltage of the battery is not appropriately converted. A converter capable of avoiding such adverse flow of an electric current from the output side of the voltage to the inductor is disclosed in Patent Literature 1.

In the converter described in Patent Literature 1, semiconductor switches are employed for the first switch, the second switch, the third switch, and the fourth switch. Then, a parasitic diode is connected between both ends of each of the first switch, the second switch, the third switch, and the fourth switch. In one parasitic diode, the anode is connected to one end of the third switch and the cathode is connected to the other end of the third switch.

In the converter described in Patent Literature 1, when the output voltage of the battery is to be stepped down, in a state that the third switch is maintained at OFF, the first switch, the second switch, and the fourth switch are turned ON/OFF individually so that the output voltage is converted. Thus, the parasitic diode prevents adverse flow of an electric current from the storage battery to the battery.

CITATION LIST

Patent Literature 1: Japanese Patent Application Laid-Open No. 2012-205427

SUMMARY

Nevertheless, in the converter described in Patent Literature 1, during the time that the output voltage of the battery is converted, an electric current continues to flow through the parasitic diode to the storage battery. Thus, a problem arises that a large loss in the electric power is caused by a voltage drop in the parasitic diode.

The present application has been devised in view of this situation, with focusing attention on the fact that when an electric current once flows from the application side of a voltage to an inductor, no electric current flows adversely from the output side of the voltage to the inductor. The present application may include a converter capable of avoiding adverse flow of an electric current from an output side of a voltage to an inductor and having a small loss in the electric power.

The converter according to the present application may include an inductor; a first switch and a second switch, one end of each of which is connected to one end of the inductor, a third switch, one end of which is connected to the other end of the inductor, and a fourth switch connected between the other ends of the inductor and the second switch, and turns ON/OFF individually the first switch, the second switch, the third switch and the fourth switch so as to convert a voltage applied between the other ends of the first switch and the second switch. The converter further may include a diode, the anode and cathode of which are connected respectively to one end and the other end of the third switch a maintaining device adapted to maintain the third switch at OFF after transition has occurred from a state that the first switch and the third switch are OFF to a state that a ON/OFF switching of the first switch is allowable and the third switch is OFF, a generating device adapted to turn, during the time that the maintaining device maintains the third switch at OFF, ON/OFF individually the first switch, the second switch and the fourth switch so as to generate an electric current that flows between the other end of the third switch and the second-switch-side one end of the fourth switch, and a release device adapted to release, after the generating device has generated the electric current, the maintaining of OFF of the third switch performed by maintaining device. The generating device includes a semiconductor transistor having a first end, a second end, and a third end, a resistance between the first end and the second end becoming small/large in correspondence with high/low of a voltage applied on the third end, a resistor provided on a pathway of an electric current flowing from the second end, and a capacitor, one end of which is connected to the third end. A constant voltage is applied on the first end. The generating device generates small/large output electric current in correspondence with high/low of a voltage of a connection node between the semiconductor transistor and the resistor. The generating device increases the output electric current by switching a voltage applied on the third end from a first voltage to a second voltage lower than the first voltage.

In the present application, one end of each of the first switch and the second switch may be connected to one end of the inductor while the other end of the inductor may be connected to one end of each of the third switch and the fourth switch. The other end of the second switch may be connected to the other end of each of the fourth switch.

Further, the anode and the cathode of the diode may be connected respectively to one end and the other end of the third switch.

When the battery is connected between the other ends of the first switch and the second switch and the storage battery is connected between the other ends of the third switch and the fourth switch, the first switch, the second switch, the third switch, and the fourth switch may be turned ON/OFF so that the output voltage of the battery is converted and then the converted voltage is outputted to the storage battery.

After transition has occurred from a state that the first switch and the third switch are OFF and hence conversion of the voltage is stopped to a state that a ON/OFF switching of the first switch is allowable and the third switch is OFF, the third switch may be maintained at OFF. Because the third switch is maintained at OFF, the diode prevents adverse flow of an electric current from the output side of the voltage to the inductor. Then, in a state that the adverse flow is prevented, the first switch, the second switch, and the fourth switch may be turned ON/OFF individually so that an output electric current is generated that flows between the other end of the third switch and the second-switch-side one end of the fourth switch. After the output electric current has been generated, the maintaining of OFF of the third switch may be released and then the first switch, the second switch, the third switch, and the fourth switch are turned ON/OFF individually so that the voltage is converted.

Thus, at the time that the OFF of the third switch has been released, an electric current is already flowing from the application side of the voltage to the inductor. Accordingly, during the time that the first switch, the second switch, the third switch, and the fourth switch are turned ON/OFF individually, for example, even when the second switch and the third switch are turned ON, it is possible that no electric current flows from the output side of the voltage to the inductor. Further, during the time that the first switch, the second switch, the third switch, and the fourth switch are turned ON/OFF individually so that the voltage is converted, it is possible that no electric current flows through the diode and hence no voltage drop occurs in the diode. Thus, the power loss in voltage conversion may be small.

A constant voltage may be applied on the first end of the semiconductor transistor and one end of the capacitor is connected to the third end of the semiconductor transistor. The resistor may be provided on the pathway of the electric current flowing from the second end of the semiconductor transistor. In the semiconductor transistor, the resistance between the first end and the second end may become small/large in correspondence with high/low of a voltage applied on the third end. Small/large output electric current is generated in correspondence with high/low of a voltage of a connection node between the semiconductor transistor and the resistor. When the voltage applied on the third end of the semiconductor transistor is switched from the first voltage to the second voltage lower than the first voltage, the voltage of the connection node may fall gradually due to the release of the electric charge of the capacitor, and then the output electric current may increase gradually.

In the converter according to the present application, the release device releases the maintaining of OFF when a predetermined time has elapsed since the maintaining device has started the maintaining.

In the present application, when a predetermined time has elapsed since the maintaining of OFF of the third switch was started, the maintaining of OFF of the third switch may be released. Thus, in a state that the OFF of the third switch is maintained, the first switch, the second switch, and the fourth switch may be turned ON/OFF individually so that a sufficient electric current flows between the other end of the third switch and the second-switch-side one end of the fourth switch. After that, the third switch may be turned OFF.

By virtue of this, in a state that adverse flow of the electric current is prevented reliably, the maintaining of OFF of the third switch can be released. For example, the predetermined time is a duration corresponding to a designed value for the operating time that, in a state that the third switch is maintained at OFF, the first switch, the second switch, and the fourth switch may be turned ON/OFF individually so that an electric current is generated that flows between the other end of the third switch and the second-switch-side one end of the fourth switch.

In the converter according to the present application, the release device may release the maintaining of OFF when a value concerning the electric current that flows between the other end of the third switch and the second-switch-side one end of the fourth switch becomes more than or equal to a predetermined value.

In the present application, when a value concerning the output electric current, for example, the voltage across the resistor connected between the other end of the third switch and the second-switch-side one end of the fourth switch, becomes a predetermined value or more, the maintaining of OFF of the third switch may be released. By virtue of this, in a state that adverse flow of the electric current is prevented reliably, the maintaining of OFF of the third switch can be released.

In the converter according to the present application, the timing of switching of the ON/OFF of the first switch and the second switch may be adjusted so that no time period is present that the first switch and the second switch are both ON.

In the present invention, the timing of switching of the ON/OFF of the first switch and the second switch is adjusted so that no time period is present that the first switch and the second switch are both ON. Thus, a short circuit between the other ends of the first switch and the second switch may be prevented.

According to the present application, in a state that the third switch is turned OFF, an electric current is caused to flow between the other end of the third switch and the second-switch-side one end of the fourth switch and then, after the electric current has been caused to flow, the maintaining of OFF of the third switch may be released. Thus, prevention of adverse flow of an electric current from the output side of the voltage to the inductor may be achieved and the loss in the electric power is small.

DETAILED DESCRIPTION OF THE EMBODIMENTS

The present application is described below in detail with reference to the drawings illustrating embodiments.

Embodiment 1

Figure 1:
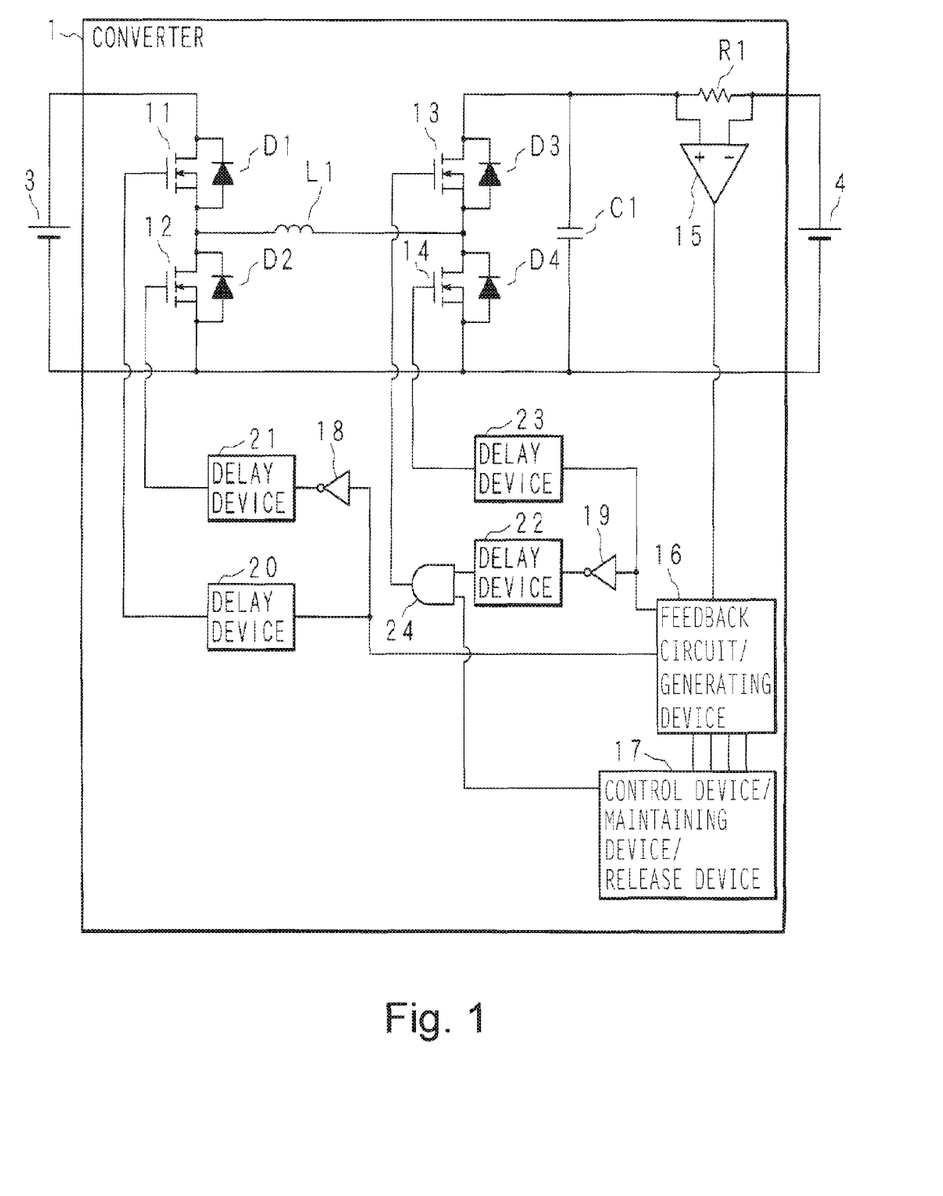
FIG. 1 is a circuit diagram of a converter according to Embodiment 1.

FIG. 1 is a circuit diagram of a converter 1 according to Embodiment 1. The converter 1 may be mounted on a vehicle and connected individually to the positive terminal and the negative terminal of a battery 3 and to the positive terminal and the negative terminal of a storage battery 4. The converter 1 steps up and down the voltage applied by the battery 3 so as to convert the voltage and then applies the converted voltage on the storage battery 4. As a result, the storage battery 4 is charged.

The converter 1 may include N-channel type FETs (Field Effect Transistors) 11, 12, 13, and 14, a differential amplifier 15, a feedback circuit 16, a control part 17, inverters 18 and 19, delay devices 20, 21, 22, and 23, an AND circuit 24, a capacitor C1, diodes D1, D2, D3, and D4, an inductor L1, and a resistor R1.

The drain of the FET 11 may be connected to the positive terminal of the battery 3 and the source of the FET 12 may be connected to the negative terminal of the battery 3. The source of the FET 11 and the drain of the FET 12 may be connected to one end of the inductor L1. The other end of the inductor L1 may be connected to the source of the FET 13 and the drain of the FET 14. The sources of the FETs 12 and 14 may be connected to each other. As such, the FET 14 may be connected between the other end of the inductor L1 and the source of the FET 12.

The drains of the FETs 11, 12, 13, and 14 may be connected respectively to the cathodes of the diodes D1, D2, D3, and D4 while the sources of the FETs 11, 12, 13, and 14 may be connected respectively to the anodes of the diodes D1, D2, D3, and D4. The diodes D1, D2, D3, and D4 may be parasitic diodes of the FETs 11, 12, 13, and 14 respectively.

The drain of the FET 13 may be connected to one end of each of the capacitor C1 and the resistor R1. The other end of the resistor R1 may be connected to the positive terminal of the storage battery 4. The source of the FET 14 is further connected to the other end of the capacitor C1 and the negative terminal of the storage battery 4. One end and the other end of the resistor R1 may be connected respectively to the plus terminal and the minus terminal of the differential amplifier 15 while the output terminal of the differential amplifier 15 may be connected to the feedback circuit 16.

In addition to the differential amplifier 15, the feedback circuit 16 may be connected to the control part 17, the input terminals of the inverters 18 and 19, and the delay devices 20 and 23. The output terminals of the inverters 18 and 19 may be connected respectively to the delay devices 21 and 22. The delay devices 20, 21, and 23 may be connected respectively to the gates of the FETs 11, 12, and 14. The control part 17 and the delay device 22 may be connected respectively to the two input terminals of the AND circuit 24. The output terminal of the AND circuit 24 may be connected to the gate of the FET 13.

The FETs 11, 12, 13, and 14 may serve as the first switch, the second switch, the third switch, and the fourth switch respectively. Each of the FETs 11, 12, 13, and 14 may be turned ON when a voltage at or more than a predetermined voltage is applied on the gate and hence an electric current flows between the drain and the source in each of the FETs 11, 12, 13 and 14. Each of the FETs 11, 12, 13 and 14 may be turned OFF when the voltage applied on the gate is less than the predetermined voltage and hence no electric current flows between the drain and the source in each of the FETs 11, 12, 13 and 14.

In the converter 1, the FETs 11, 12, 13, and 14 may be turned ON/OFF individually so that the voltage applied between the drain of the FET 11 and the source of the FET 12 by the battery 3 is converted. The converted voltage may be outputted from the drain of the FET 13 and the source of the FET 14. The outputted voltage may be smoothed by the capacitor C1 and then applied through the resistor R1 on the storage battery 4.

The differential amplifier 15 may amplify the voltage applied between the plus terminal and the minus terminal, that is, the voltage across the resistor R1, and then may output the amplified voltage through the output terminal to the feedback circuit 16. The voltage across the resistor R1 may be proportional to the magnitude of the electric current that flows through the resistor R1. Thus, the voltage outputted by the differential amplifier 15 becomes high/low in correspondence with the large/small of the output electric current that flows through the resistor R1 to the storage battery 4.

A voltage corresponding to the output electric current may be inputted from the differential amplifier 15 to the feedback circuit 16 and a reference voltage Vr and two triangular waves W1 and W2 are inputted from the control part 17 to the feedback circuit 16. On the basis of the voltage inputted from the differential amplifier 15 and the reference voltage Vr inputted from the control part 17, the feedback circuit 16 generates thresholds V1 and V2.

In accordance with the relation between the generated threshold V1 and the triangular wave W1, the feedback circuit 16 outputs a voltage of high level or low level to the input terminal of the inverter 19 and to the delay device 23. The voltages of high level and low level may be constant and the voltage of high level may be higher than the voltage of low level.

Further, in accordance with the relation between the generated threshold V2 and the triangular wave W2, the feedback circuit 16 outputs a voltage of high level or low level to the input terminal of the inverter 18 and to the delay device 20.

Each of the inverters 18 and 19 may output a voltage of low level through the output terminal, when a voltage of high level is inputted from the feedback circuit 16 to the input terminal Each of the inverter 18 and 19 may output a voltage of high level through the output terminal, when a voltage of low level is inputted from the feedback circuit 16 to the input terminal.

A voltage of high level or low level may be inputted from the feedback circuit 16 to each of the delay device 20 and 23 and a voltage of high level or low level may be inputted from each of the inverters 18 and 19 to each of the delay devices 21 and 22. When a voltage of high level is inputted, each of the delay devices 20, 21, 22, and 23 may output a voltage of high level. When a voltage of low level is inputted, each of the delay devices 20, 21, 22 and 23 may output a voltage of low level. In the delay devices 20, 21, 22, and 23, a time delay may be provided from the time that the voltage of high level or low level is inputted to the time that the voltage of high level or low level is outputted. This adjusts the timing of outputting the voltage of high level or low level.

In the AND circuit 24, an adverse-flow prevention signal composed of voltages of high level and low level may be inputted from the control part 17 to one input terminal. In the AND circuit 24, a voltage of high level or low level may be inputted from the delay device 22 to the other input terminal. When the inputted adverse-flow prevention signal is at a voltage of high level, the AND circuit 24 outputs the voltage of high level or low level inputted from the delay device 22, intact through the output terminal. Further, when the inputted adverse-flow prevention signal is at a voltage of low level, the AND circuit 24 may output a voltage of low level through the output terminal regardless of the voltage inputted from the delay device 22.

Each of the delay devices 20, 21, and 23 may output a voltage of high level or low level to each of the gates of the FETs 11, 12, and 14. The AND circuit 24 may output a voltage of high level or low level through the output terminal to the gate of the FET 13.

In each of the FETs 11, 12, 13, and 14, when a voltage of high level is outputted to the gate, a voltage at or more than a predetermined voltage may be applied on the gate so that each of the FETs 11, 12, 13 and 14 is turned ON. In each of the FETs 11, 12, 13 and 14, when a voltage of low level is outputted to the gate, a voltage less than the predetermined voltage may be applied on the gate so that each of the FETs 11, 12, 13 and 14 is turned OFF.

By virtue of the operation of the inverter 18, the FETs 11 and 12 may be turned ON/OFF complementarily. Specifically, when the FET 11 is ON, the FET 12 is OFF. When the FET 11 is OFF, the FET 12 is ON.

Further, when the adverse-flow prevention signal inputted to one terminal of the AND circuit 24 is at a voltage of high level, the FETs 13 and 14 may be turned ON/OFF complementarily. Specifically, when the FET 13 is ON, the FET 14 is OFF. When the FET 13 is OFF, the FET 14 is ON.

Each of the delay devices 20 and 21 may adjust the time delay. Therefore, the timing of switching of the ON/OFF of the FETs 11 and 12 may be adjusted so that no time period is present that the FETs 11 and 12 are both ON. Further, each of the delay devices 22 and 23 also may adjust the time delay so that no time period is present that the FETs 13 and 14 are both ON. This prevents a short circuit between the drain of the FET 11 and the source of the FET 12 and a short circuit between the drain of the FET 13 and the source of the FET 14.

As described above, in correspondence with the voltage inputted from the differential amplifier 15 and to the reference voltage Vr and the triangular waves W1 and W2 inputted from the control part 17, the feedback circuit 16 may output a voltage of high level or low level so that each of the FETs 11, 12, 13, and 14 is turned ON/OFF.

The control part 17 may output the reference voltage Vr and the triangular waves W1 and W2 to the feedback circuit 16 and may output the adverse-flow prevention signal to one terminal of the AND circuit 24.

Figure 2:
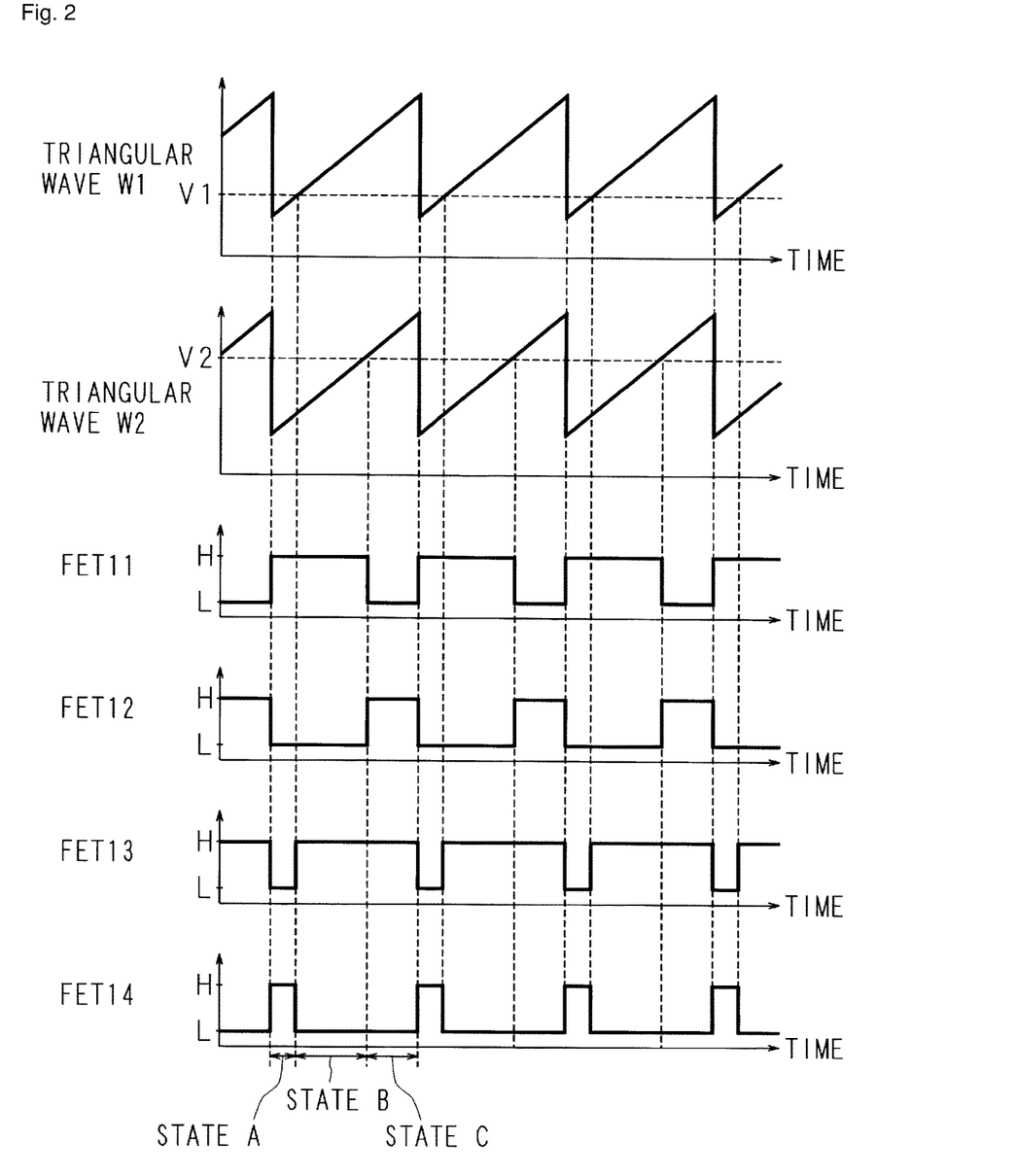
FIG. 2 is a timing chart used for describing the operation of a converter.

FIG. 2 is a timing chart used for describing the operation of the converter 1. In the description of the operation of the converter 1 given below, the adverse-flow prevention signal inputted to one input terminal of the AND circuit 24 is premised to be at high level. FIG. 2 illustrates a transition of the triangular waves W1 and W2 outputted from the control part 17 to the feedback circuit 16 and a transition of the voltages applied on the gates of the FETs 11, 12, 13, and 14. In FIG. 2, "H" indicates a voltage of high level and "L" indicates a voltage of low level.

Each of the triangular waves W1 and W2 outputted from the control part 17 to the feedback circuit 16 has a waveform in which a moderate rise of voltage and a rapid fall of voltage are repeated periodically, which is referred to as a sawtooth wave. The triangular waves W1 and W2 have the same time point of start of voltage rise, and the period of each of the triangular waves W1 and W2 is constant.

During the time that the voltage of the triangular wave W1 is less than the generated threshold V1, the feedback circuit 16 may output a voltage of high level to the input terminal of the inverter 19 and to the delay device 23. Thus, in the FET 13, a voltage of low level is applied on the gate so that the FET 13 is turned OFF. Further, in the FET 14, a voltage of high level is applied on the gate so that the FET 14 is turned ON.

During the time that the voltage of the triangular wave W1 is at or more than the generated threshold V1, the feedback circuit 16 may output a voltage of low level to the input terminal of the inverter 19 and to the delay device 23. Thus, in the FET 13, a voltage of high level may be applied on the gate so that the FET 13 is turned ON. Further, in the FET 14, a voltage of low level may be applied on the gate so that the FET 14 is turned OFF.

During the time that the voltage of the triangular wave W2 is less than the generated threshold V2, the feedback circuit 16 may output a voltage of high level to the input terminal of the inverter 18 and to the delay device 20. Thus, in the FET 11, a voltage of high level may be applied on the gate so that the FET 11 is turned ON. Further, in the FET 12, a voltage of low level is applied on the gate so that the FET 12 is turned OFF.

During the time that the voltage of the triangular wave W2 is at or more than the generated threshold V2, the feedback circuit 16 may output a voltage of low level to the input terminal of the inverter 18 and to the delay device 20. Thus, in the FET 11, a voltage of low level may be applied on the gate so that the FET 11 is turned OFF. Further, in the FET 12, a voltage of high level is applied on the gate so that the FET 12 is turned ON.

The triangular waves W1 and W2 outputted from the control part 17 to the feedback circuit 16 may have periodic waveforms. Thus, a periodic pulse voltage composed of voltages of high level and low level may be applied on the gate of each of the FETs 11, 12, 13, and 14. The duty of the pulse voltage may be determined in correspondence with the thresholds V1 and V2 generated by the feedback circuit 16.

As described above, when the FETs 11, 12, 13, and 14 are turned ON/OFF, the FETs 11, 12, 13, and 14 transit between a plurality of ON/OFF states. In Embodiment 1, as seen from FIG. 2, the FETs 11, 12, 13, and 14 may sequentially transit between state A in which the FETs 11, 12, 13, and 14 are ON, OFF, OFF, and ON, state B in which the FETs 11, 12, 13, and 14 are ON, OFF, ON, and OFF, and state C in which the FETs 11, 12, 13, and 14 are OFF, ON, ON, and OFF.

When the FETs 11, 12, 13, and 14 are in state A, an electric current may flow from the positive terminal of the battery 3 through the FET 11, the inductor L1, and the FET 14 in this order and then returns to the negative terminal of the battery 3. During this time, a large amount of electric current may flow through the inductor L1 so that energy is accumulated.

When the ON/OFF state of the FETs 11, 12, 13, and 14 has transited from state A to state B, the electric current may flow from the positive terminal of the battery 3 through the FET 11, the inductor L1, the FET 13, the resistor R1, and the storage battery 4 in this order and then returns to the negative terminal of the battery 3. In state B, in comparison with the electric current that flows when the ON/OFF state of the FETs 11, 12, 13, and 14 is of state A, the electric current may flow through the resistor R1 and the storage battery 4 so that the electric current that flows through the inductor L1 is reduced.

At that time, the inductor L1 may release the accumulated energy in order to maintain the electric current that flows through itself. Thus the inductor L1 may step up, with adopting as a reference the voltage at one end on the FET 11 side, the voltage at the other end on the FET 13 side. As a result, the voltage between the drain of the FET 13 and the source of the FET 14 may be stepped up and then the stepped-up voltage may be applied through the resistor R1 on the storage battery 4. By virtue of this step-up, the amount of the electric current that flows through the resistor R1 may rise.

After that, as the energy of the inductor L1 is released, the voltage on the other end on the FET 13 side may fall gradually. When the ON/OFF state of the FETs 11, 12, 13, and 14 is of state B, an electric current flows through the inductor L1 by virtue of the battery 3 and hence a certain amount of energy may be accumulated in the inductor L1.

When the ON/OFF state of the FETs 11, 12, 13, and 14 has transited from state B to state C, the electric current from the battery 3 to the inductor L1 may stop. Thus, the inductor L1 may release the energy in order to maintain the electric current that flows through itself. As a result, the electric current may flow from the inductor L1 through the FET 13, the resistor R1, the storage battery 4, and the FET 12 in this order and then returns to the inductor L1.

As the energy of the inductor L1 decreases in association with the release, the amount of the electric current that returns from the drain of the FET 13 through the resistor R1 and the storage battery 4 to the source of the FET 14 may decrease so that the voltage between the drain of the FET 13 and the source of the FET 14 is stepped down.

The voltage stepped up and down in accordance with ON/OFF of the FETs 11, 12, 13, and 14 may be smoothed by the capacitor C1 and then the smoothed voltage may be applied through the resistor R1 on the storage battery 4.

When the ON/OFF state of the FETs 11, 12, 13, and 14 transits repeatedly in the order of states A, B, and C, the voltage applied by the battery 3 on the converter 1 is converted and then the converted voltage is applied on the storage battery 4.

In a case that the ON/OFF state of the FETs 11, 12, 13, and 14 transits repeatedly in the order of states A, B, and C, when the duration of state A becomes longer, the step-up width of the voltage may become larger and the output electric current that flows through the resistor R1 to the storage battery 4 may become larger. When the duration of state C becomes longer, the voltage step-down width of the voltage may become larger and the output electric current may become smaller.

In the feedback circuit 16, when the voltage outputted from the differential amplifier 15 and proportional to the output electric current becomes lower, the thresholds V1 and V2 may become higher. Thus, the duration of state A becomes longer and the duration of state C becomes shorter. Accordingly, the step-up width of the voltage between the drain of the FET 13 and the source of the FET 14 becomes larger and the voltage step-down width of the voltage may become smaller so that the amount of the electric current that flows through the resistor R1 increases.

Further, in the feedback circuit 16, when the voltage outputted from the differential amplifier 15 and proportional to the output electric current becomes higher, the thresholds V1 and V2 may become lower. Thus, the duration of state A becomes shorter and the duration of state C becomes longer. Accordingly, the step-up width of the voltage between the drain of the FET 13 and the source of the FET 14 becomes smaller and the voltage step-down width of the voltage may become larger so that the amount of the electric current that flows through the resistor R1 decreases.

When the threshold V1 falls and becomes less than the minimum of the triangular wave W1, voltages of high level and low level may be applied on the gates of the FETs 13 and 14 respectively so that the FETs 13 and 14 are maintained at ON and OFF. Thus, the FETs 11, 12, 13, and 14 may transit repeatedly in the order of states B and C so that voltage step-down alone is performed.

When the threshold V2 rises and becomes more than or equal to the maximum of the triangular wave W2, voltages of high level and low level may be applied on the gates of the FETs 11 and 12 respectively so that the FETs 11 and 12 are maintained at ON and OFF. Thus, the FETs 11, 12, 13, and 14 may transit repeatedly in the order of states A and B so that voltage step-up alone is performed.

When both the thresholds V1 and V2 becomes less than the minimums of the triangular waves W1 and W2, a voltage of low level may be applied on the gates of the FETs 11 and 14 so that the FETs 11 and 14 are both maintained at OFF. Further, a voltage of high level may be applied on the gates of the FETs 12 and 13 so that the FETs 12 and 13 are both maintained at ON. After that, when the adverse-flow prevention signal is switched from a voltage of high level to a voltage of low level, the FET 13 is turned OFF and hence no electric current flows from the battery 3 and the storage battery 4 to the inductor L1. Thus, after the inductor L1 has released the entire energy, voltage conversion of the converter 1 may be stopped.

Figure 3:
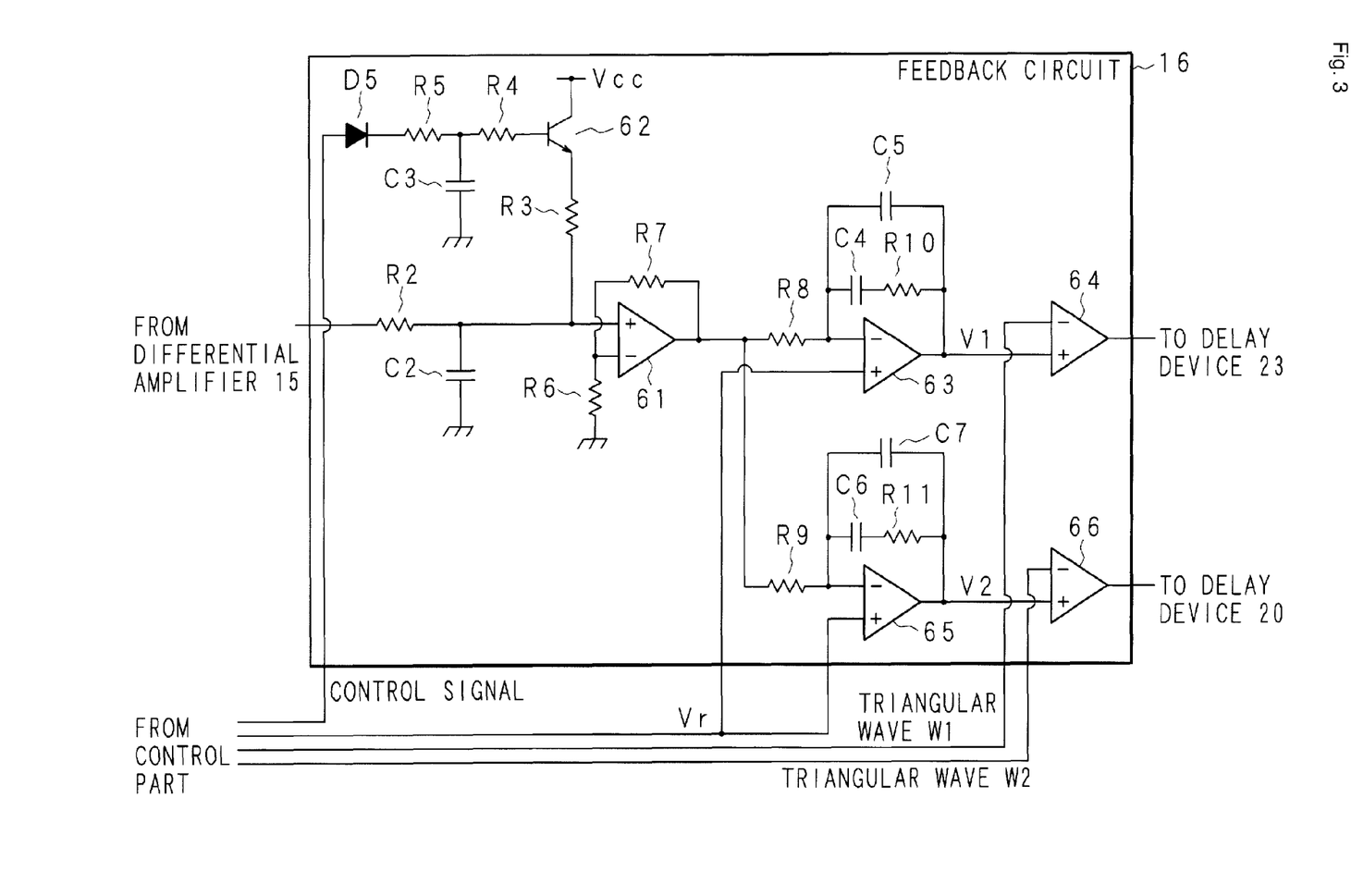
FIG. 3 is a circuit diagram of a feedback circuit.

FIG. 3 is a circuit diagram of the feedback circuit 16. The feedback circuit 16 includes differential amplifiers 61, 63, and 65, an NPN-type bipolar transistor 62, comparators 64 and 66, capacitors C2-C7, a diode D5, and resistors R2-R11.

In the feedback circuit 16, the output terminal of the differential amplifier 15 is connected to one end of the resistor R2. The other end of the resistor R2 is connected to one end of each of the capacitor C2 and the resistor R3 and to the plus terminal of the differential amplifier 61. The other end of the resistor R3 is connected to the emitter of the bipolar transistor 62. A constant voltage V cc is applied on the collector of the bipolar transistor 62. The base of the bipolar transistor 62 is connected to one end of the resistor R4. The other end of the resistor R4 is connected to one end of each of the capacitor C3 and the resistor R5. The other end of the resistor R5 is connected to the cathode of the diode D5 and the anode of the diode D5 is connected to the control part 17.

The minus terminal of the differential amplifier 61 is connected to one end of each of the resistors R6 and R7. The other end of resistor R7 is connected to the output terminal of the differential amplifier 61. The other end of each of the capacitors C2 and C3, and the resistor R6 is grounded. The output terminal of the differential amplifier 61 is connected further to one end of each of the resistors R8 and R9.

The other end of the resistor R8 is connected to the minus terminal of the differential amplifier 63 and to one end of each of the capacitors C4 and C5. The other end of the capacitor C4 is connected to one end of the resistor R10 while the other end of each of the capacitor C5 and the resistor R10 is connected to the output terminal of the differential amplifier 63. The plus terminal of the differential amplifier 63 is connected to the plus terminal of differential amplifier 65 and to the control part 17.

The output terminal of the differential amplifier 63 is further connected to the plus terminal of the comparator 64. The minus terminal of the comparator 64 is connected to the control part 17. The output terminal of the comparator 64 is connected to the delay device 23. The output terminal of the comparator 64 is connected to the input terminal of the inverter 19 in addition to the delay device 23.

The other end of the resistor R9 is connected to the minus terminal of the differential amplifier 65 and to one end of each of the capacitors C6 and C7. The other end of the capacitor C6 is connected to one end of the resistor R11 while the other end of each of the capacitor C7 and the resistor R11 is connected to the output terminal of the differential amplifier 65. The output terminal of the differential amplifier 65 is further connected to the plus terminal of the comparator 66. The minus terminal of the comparator 66 is connected to the control part 17. The output terminal of the comparator 66 is connected to the delay device 20. The output terminal of the comparator 66 is connected to the input terminal of the inverter 18 in addition to the delay device 20.

The voltage outputted by the differential amplifier 15 is inputted through the resistor R2 to the plus terminal of the differential amplifier 61. The capacitor C2 is provided for stabilizing the voltage inputted to the plus terminal of the differential amplifier 61.

The differential amplifier 61 and the resistors R6 and R7 serve as an amplifier and amplify the voltage inputted to the plus terminal of the differential amplifier 61 and then input the amplified voltage through the resistor R8 to the minus terminal of the differential amplifier 63. The amplifier constructed from the differential amplifier 61 and the resistors R6 and R7, similarly, inputs the amplified voltage through the resistor R9 to the minus terminal of the differential amplifier 65.

The reference voltage Vr is inputted from the control part 17 to the plus terminal of the differential amplifier 63. The differential amplifier 63, the capacitors C4 and C5, and the resistors R8 and R10 may serve as an error amplifier and amplify the difference between the reference voltage Vr inputted to the plus terminal of the differential amplifier 63 and the voltage inputted to the minus terminal of the differential amplifier 63. The gain of this error amplifier may be different depending on the frequency of the difference of the voltages applied on the plus terminal and the minus terminal of the differential amplifier 63. That is, the gain for low-frequency components is large and the gain for high frequency components may be small. This achieves suppression of noise components present in the high frequency domain.

The error amplifier constructed from the differential amplifier 63, the capacitors C4 and C5 and the resistors R8 and R10 may amplify the difference so as to generate the threshold V1 and then may input the generated threshold V1 through the output terminal of the differential amplifier 63 to the plus terminal of the comparator 64.

When the voltage inputted to the minus terminal of the differential amplifier 63 relative to the reference voltage Vr inputted to the plus terminal is lower, the threshold V1 may be higher. Further, when the voltage inputted to the minus terminal of the differential amplifier 63 relative to the reference voltage Vr is higher, the threshold V1 may be lower.

In the comparator 64, during the time that the voltage of the triangular wave W1 inputted to the minus terminal is less than the threshold V1 inputted to the plus terminal, the comparator 64 may output a voltage of high level through the output terminal to the input terminal of the inverter 19 and to the delay device 23. In the comparator 64, during the time that the voltage of the triangular wave W1 inputted to the minus terminal is at or more than the threshold V1 inputted to the plus terminal, the comparator 64 may output a voltage of low level through the output terminal to the input terminal of the inverter 19 and to the delay device 23.

The reference voltage Vr is inputted from the control part 17 to the plus terminal of the differential amplifier 65. The differential amplifier 65, the capacitors C6 and C7, and the resistors R9 and R11 may serve as an error amplifier and amplify the difference between the reference voltage Vr inputted to the plus terminal of the differential amplifier 65 and the voltage inputted to the minus terminal of the differential amplifier 65. The gain of this error amplifier may be different depending on the frequency of the difference of the voltages applied on the plus terminal and the minus terminal of the differential amplifier 65. That is, the gain for low-frequency components is large and the gain for high frequency components may be small. This achieves suppression of noise components present in the high frequency domain.

The error amplifier constructed from the differential amplifier 65, the capacitors C6 and C7 and the resistors R9 and R11 may amplify the difference so as to generate the threshold V2 and then may input the generated threshold V2 through the output terminal of the differential amplifier 65 to the plus terminal of the comparator 66.

When the voltage inputted to the minus terminal of the differential amplifier 65 relative to the reference voltage Vr inputted to the plus terminal is lower, the threshold V2 may be higher. Further, when the voltage inputted to the minus terminal of the differential amplifier 65 relative to the reference voltage Vr is higher, the threshold V2 may be lower.

In the comparator 66, during the time that the voltage of the triangular wave W2 inputted to the minus terminal is less than the threshold V2 inputted to the plus terminal, the comparator 66 may output a voltage of high level through the output terminal to the input terminal of the inverter 18 and to the delay device 20. In the comparator 66, during the time that the voltage of the triangular wave W2 inputted to the minus terminal is at or more than the threshold V2 inputted to the plus terminal, the comparator 66 may output a voltage of low level through the output terminal to the input terminal of the inverter 18 and to the delay device 20.

In the bipolar transistor 62, the resistance between the collector and the emitter becomes small/large in correspondence with the high/low of the voltage applied on the base. The control signal composed of voltages of high level and low level is inputted, through the diode D5 and the resistors R4 and R5, to the base of the bipolar transistor 62. The diode D5 prevents a situation that an electric current flows from the capacitor C3 to the control part 17.

When the control signal inputted from the control part 17 is at a voltage of high level, a sufficiently high voltage is applied on the base of the bipolar transistor 62. At that time, the resistance between the collector and the emitter in the bipolar transistor 62 is as small as negligible when compared with the resistances of the resistors R2 and R3. Thus, when the control signal is at a voltage of high level, the plus terminal of the differential amplifier 61 receives a voltage obtained by dividing with the resistors R2 and R3 the difference voltage between the voltage Vcc and the voltage outputted by the differential amplifier 15 through the output terminal The voltage Vcc is sufficiently larger than the maximum voltage of the voltage outputted by the differential amplifier 15 through the output terminal. Thus, a sufficiently large voltage is applied also on the plus terminal of the differential amplifier 61. Further, during the time that the control signal is at a voltage of high level, electric charge is accumulated on the capacitor C3.

When the control signal inputted from the control part 17 is switched from a voltage of high level to a voltage of low level, the capacitor C3 releases the accumulated electric charge. In association with the release of the electric charge, an electric current flows from one end of the capacitor C3 through the resistor R4 and the base and the emitter of the bipolar transistor 62 in the order and then flows from the emitter of the bipolar transistor 62 through the resistors R3 and R2 to the output terminal of the differential amplifier 15. This electric current decreases in association with decrease of the electric charge accumulated on the capacitor C3.

Thus, the voltage applied on the gate of the bipolar transistor 62 falls gradually in accordance with a time constant determined by the capacitance of the capacitor C3 and the resistances of the resistors R3 and R4. As a result, the resistance between the collector and the emitter of the bipolar transistor 62 increases and hence the voltage applied on the plus terminal of the differential amplifier 61 falls gradually. When the resistance between the collector and the emitter of the bipolar transistor 62 becomes sufficiently larger than the resistance of each of the resistors R2 and R3, the output voltage of the differential amplifier 15 is inputted to the plus terminal of the differential amplifier 61.

In the feedback circuit 16 constructed as described above, when the voltage inputted to the plus terminal of the differential amplifier 61 is the output voltage of the differential amplifier 15, the voltage outputted by the differential amplifier 15 is amplified by the amplifier constructed from the differential amplifier 61 and the resistors R6 and R7. Then, the amplified voltage is applied on the minus terminals of the differential amplifiers 63 and 65. As described above, the voltage outputted by the differential amplifier 15 becomes high/low in correspondence with the large/small of the output electric current that flows through the resistor R1. Thus, similarly, the voltage applied on the minus terminals of the differential amplifiers 63 and 65 becomes high/low in correspondence with the large/small of the output electric current.

When the voltage inputted to the minus terminal of the differential amplifier 63 becomes higher, the threshold V1 outputted by the differential amplifier 63 through the output terminal may become lower. Thus, as described in the explanation of the operation of the converter 1 with reference to FIG. 2, the duration of state A may become shorter so that the step-up width of the voltage between the drain of the FET 13 and the source of the FET 14 becomes smaller and hence the amount of the output electric current that flows through the resistor R1 to the storage battery 4 may decrease.

When the voltage inputted to the minus terminal of the differential amplifier 63 becomes lower, the threshold V1 outputted by the differential amplifier 63 through the output terminal may become higher. Thus, as described in the explanation of the operation of the converter 1 with reference to FIG. 2, the duration of state A becomes longer so that the step-up width of the voltage between the drain of the FET 13 and the source of the FET 14 becomes larger and hence the amount of the output electric current that flows through the resistor R1 to the storage battery 4 may increase.

When the voltage inputted to the minus terminal of the differential amplifier 65 becomes higher, the threshold V2 outputted by the differential amplifier 65 through the output terminal may become lower. Thus, as described in the explanation of the operation of the converter 1 with reference to FIG. 2, the duration of state C becomes longer so that the step-down width of the voltage between the drain of the FET 13 and the source of the FET 14 becomes larger and hence the amount of the output electric current that flows through the resistor R1 to the storage battery 4 may decrease.

When the voltage inputted to the minus terminal of the differential amplifier 65 becomes lower, the threshold V2 outputted by the differential amplifier 65 through the output terminal may become higher. Thus, as described in the explanation of the operation of the converter 1 with reference to FIG. 2, the duration of state C becomes shorter so that the step-down width of the voltage between the drain of the FET 13 and the source of the FET 14 becomes smaller and hence the amount of the output electric current that flows through the resistor R1 to the storage battery 4 may increase.

When the voltage applied on the plus terminal of the differential amplifier 61 is the output voltage of the differential amplifier 15, the voltage step-up width may be adjusted such that the voltage of the minus terminal of the differential amplifier 63 should become the reference voltage Vr outputted from the control part 17. Further, the voltage step-down width may be adjusted such that the voltage of the minus terminal of differential amplifier 65 should become the reference voltage Vr outputted from the control part 17. Thus, the output electric current that flows from the resistor R1 is adjusted to the electric current determined by the reference voltage Vr outputted from the control part 17. When the reference voltage Vr becomes larger, the output electric current that flows from the resistor R1 may be adjusted to a larger electric current.

When the control signal is at a voltage of high level so that a sufficiently large voltage is applied on the plus terminal of the differential amplifier 61 as described above, the voltage amplified by the amplifier constructed from the differential amplifier 61 and the resistors R6 and R7 and then applied on the minus terminals of the differential amplifiers 63 and 65 may be sufficiently higher than the reference voltage Vr. Thus, the thresholds V1 and V2 outputted by the differential amplifiers 63 and 65 through the output terminals become both lower than the minimums of the triangular waves W1 and W2 outputted from the control part 17. When the control signal is at a voltage of high level and the adverse-flow prevention signal is at a voltage of low level, as described in the explanation of the operation of the converter 1 with reference to FIG. 2, the FETs 11, 13, and 14 may be turned OFF so that voltage conversion may be stopped.

Figure 4:
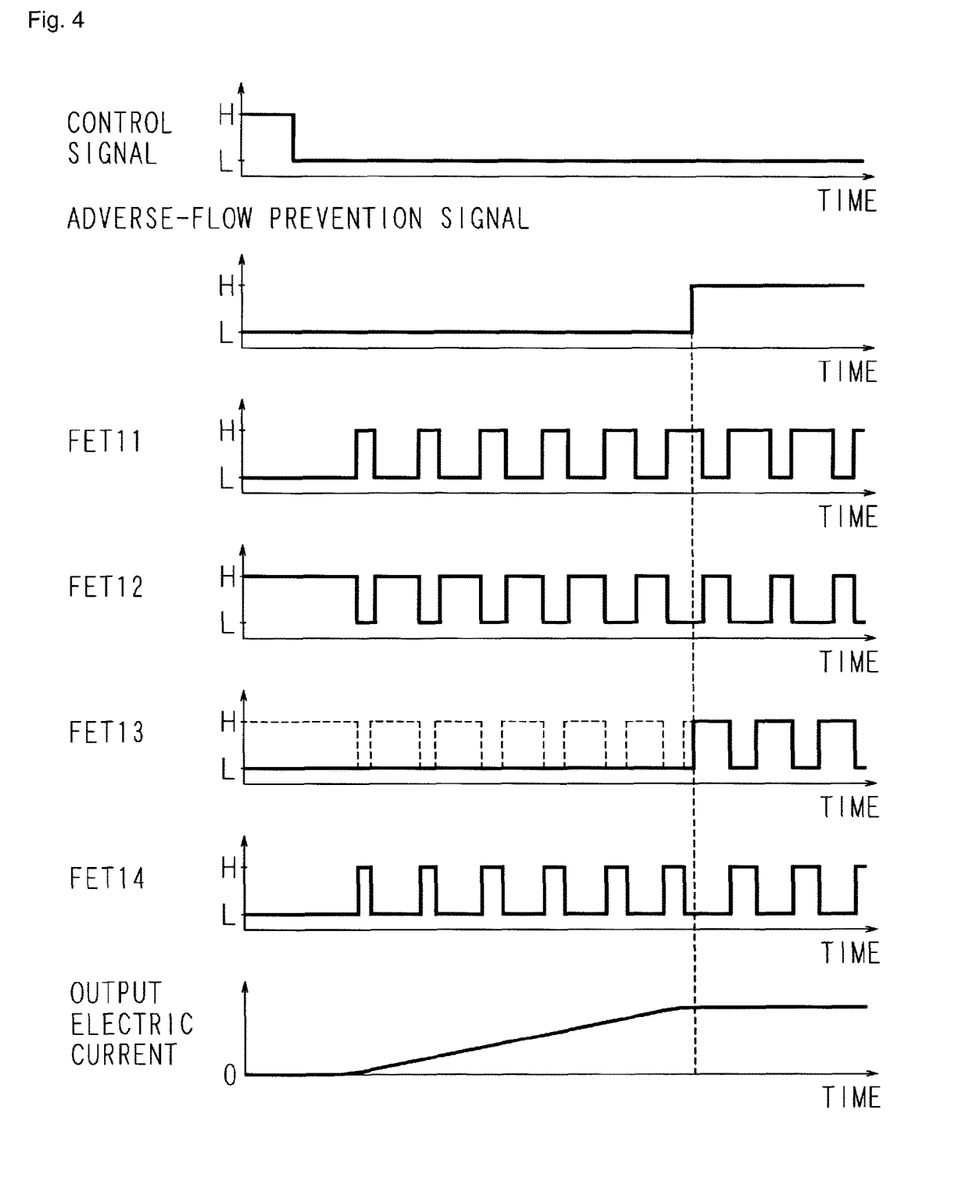
FIG. 4 is a timing chart used for describing the operation of start of voltage conversion by a converter.

FIG. 4 is a timing chart used for describing the operation of start of voltage conversion by the converter 1. FIG. 4 illustrates the transition of the control signal and the adverse-flow prevention signal outputted from the control part 17, the transition of the voltages applied on each of the gates of the FETs 11, 12, 13, and 14, and the transition of the output electric current that flows through the resistor R1 to the storage battery 4.

As described above, the control part 17 sets the control signal at a voltage of high level so as to turn OFF the FETs 11 and 14 and sets the adverse-flow prevention signal at a voltage of low level so as to turn OFF the FET 13. Therefore the control part 17 may stop voltage conversion. When voltage conversion is to be started from the state of stopped voltage conversion, the control part 17 may switch the control signal from a voltage of high level to a voltage of low level. As a result, transition may occur from a state that the FETs 11, 13, and 14 are OFF to a state that ON/OFF switchings of the FETs 11 and 14 are allowable and the FET 13 is OFF.

The adverse-flow prevention signal may be maintained at a voltage of low level by the control part 17. Thus, the AND circuit 24 may output a voltage of low level through the output terminal so that the FET 13 is maintained at OFF. As such, after the transit to the state that ON/OFF switchings of the FETs 11 and 14 respectively are allowable and the FET 13 is OFF, the control part 17 may maintain the FET 13 at OFF. During the time that the FET 13 is maintained at OFF, adverse flow of the electric current from the output side of the voltage, that is, from the storage battery 4, to the inductor L1 may be prevented.

The control part 17 serves as the maintaining device. Further, in FIG. 4, the dashed line indicates the transition of the voltage applied on the gate of the FET 13 when the adverse-flow prevention signal is at a voltage of high level.

After the control part 17 has switched the control signal from a voltage of high level to a voltage of low level, the capacitor C3 may release the electric charge. Thus, as described above, the voltage applied on the plus terminal of the differential amplifier 61 may fall gradually. When the voltage applied on the plus terminal of the differential amplifier 61 falls, the voltage applied on the plus terminals of the differential amplifiers 63 and 65 may fall gradually so that the thresholds V1 and V2 having been less than the minimums of the triangular waves W1 and W2 rise gradually.

When the thresholds V1 and V2 rise and become respectively more than or equal to the minimums of the triangular waves W1 and W2 and less than the maximums of the triangular waves W1 and W2, the state of the FETs 11, 12, and 14 transits in the order of a first state that the FETs 11, 12, and 14 may be respectively ON, OFF, and ON, a second state that the FETs 11, 12, and 14 may be respectively ON, OFF, and OFF, and a third state that the FETs 11, 12, and 14 may be respectively OFF, ON, and OFF.

When the FETs 11, 12, and 14 are in the first state, the electric current may flow from the positive terminal of the battery 3 through the FET 11, the inductor L1, and the FET 14 in this order and then may return to the negative terminal of the battery 3. During this time, energy is accumulated in the inductor L1. The first state corresponds to the state A.

When the FETs 11, 12, and 14 have transited from the first state to the second state, the electric current may flow from the positive terminal of the battery 3 through the FET 11, the inductor L1, the diode D3, the resistor R1, and the storage battery 4 in this order and then returns to the negative terminal of the battery 3. The second state corresponds to the state B. When transition has occurred from the first state to the second state, similarly to the case of transition from state A to state B, the electric current that flows through the inductor L1 may fall. Thus, the inductor L1 may perform step-up so that the output electric current that flows through the resistor R1 to the storage battery 4 increases. The step-up width of the voltage becomes large/small in correspondence with the long/short of the duration of the first state.

Further, when the FETs 11, 12, and 14 have transited from the second state to the third state, the electric current from the battery 3 to the inductor L1 may stop. Therefore, the inductor L1 may release the energy in order to maintain the electric current that flows through itself. Thus, the electric current flows from the inductor L1 through the diode D3, the resistor R1, the storage battery 4, and the FET 12 in this order and then returns to the inductor L1. As the energy of the inductor L1 decreases in association with the release, the amount of the output electric current that returns from the drain of the FET 13 through the resistor R1 and the storage battery 4 to the source of the FET 14 may decrease so that the voltage between the drain of the FET 13 and the source of the FET 14 is stepped down. The third state corresponds to the state C. The step-down width of the voltage becomes large/small in correspondence with the long/short of the duration of the third state.

As the capacitor C3 releases the electric charge so that the thresholds V1 and V2 rise gradually, the duration of the first state may become longer and the duration of the third state may become shorter. As a result, the step-up width of the voltage may gradually become larger and the step-down width of the voltage may gradually become smaller. Thus, the output electric current that returns from the drain of the FET 13 through the resistor R1 and the storage battery 4 to the source of the FET 14 may increase gradually.

As described above, during the time that the control part 17 holds the adverse-flow prevention signal at low level so as to maintain the FET 13 at OFF, the feedback circuit 16 may turn ON/OFF individually the FETs 11, 12, and 14 such that the state transits, in order, to the first state, the second state, and the third state. By virtue of this, the feedback circuit 16 may generate an output electric current that flows between the drain of the FET 13 and the source of the FET 14 through the resistor R1 and the storage battery 4. The feedback circuit 16 serves as the generating device.

After the feedback circuit 16 generates the output electric current, the control part 17 may switch the adverse-flow prevention signal from a voltage of low level to a voltage of high level so as to release the maintaining of OFF of the FET 13. When a predetermined time has elapsed since the control signal has been switched from a voltage of high level to a voltage of low level so that the maintaining of OFF of the FET 13 has been started, the control part 17 may switch the adverse-flow prevention signal from a voltage of low level to a voltage of high level so as to release the maintaining of OFF of the FET 13. The control part 17 serves as the release device.

As a result, as described above in the explanation of the operation with reference to FIG. 2, the FETs 11, 12, 13, and 14 may be turned ON/OFF individually. Thus, the converter 1 performs voltage conversion so that the output electric current that flows through the resistor R1 to the storage battery 4 becomes a constant electric current determined by the reference voltage Vr. At that time, an electric current is already flowing from the battery 3, that is, from the application side of the voltage, to the inductor L1. Thus, during the time that the FETs 11, 12, 13, and 14 are turned ON/OFF individually, even when the FETs 12 and 13 are turned ON, it may be that no electric current flows from the storage battery 4, that is, from the output side of the voltage, to the inductor L1. Further, during the time that the FETs 11, 12, 13, and 14 are turned ON/OFF individually so that the voltage is converted, it may be that no electric current flows through the diode D3. Thus, no voltage drop may occur in the diode D3 and hence the power loss in voltage conversion is small.

Further, the predetermined time that elapses from the time when transition has occurred to a state that the ON/OFF switchings of the FETs 11 and 14 respectively are allowable and the FET 13 is OFF, to the time when the maintaining of OFF of the FET 13 is released is set forth suitably. Therefore, in a state that a sufficient electric current flows from the drain of the FET 13 through the resistor R1 and the storage battery 4 to the drain of the FET 14 so that adverse flow of the electric current is prevented reliably, the maintaining of OFF of the FET 13 can be released. For example, the predetermined time may be set as a duration corresponding to a designed value for the operating time that, in a state that the FET 13 is maintained at OFF, the FETs 11, 12, and 14 are turned ON/OFF individually so that an output electric current is generated that flows from the drain of the FET 13 to the source of the FET 14.

Modification of Embodiment 1

Figure 5:
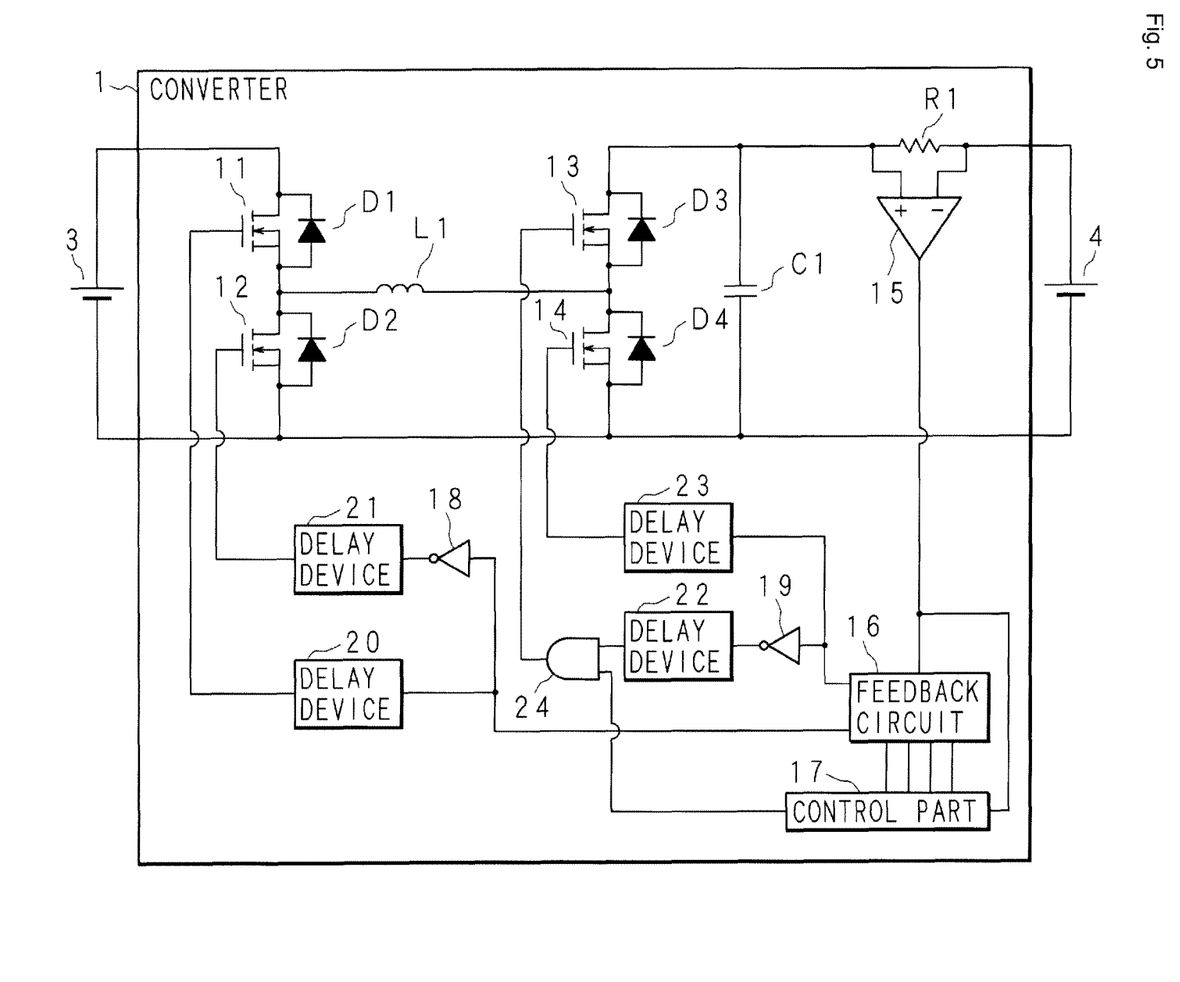
FIG. 5 is a circuit diagram of a converter according to a modification of Embodiment 1.

FIG. 5 is a circuit diagram of a converter 1 according to a modification of Embodiment 1. In comparison with the converter 1 illustrated in FIG. 2, the converter 1 according to this modification has a difference that the control part 17 is further connected to the output terminal of the differential amplifier 15.

In the converter 1 according to the modification, the control part 17 may detect the output voltage of the differential amplifier 15. When the control signal has been switched from a voltage of high level to a voltage of low level so that the maintaining of OFF of the FET 13 has been started and, after that, the output voltage of the differential amplifier 15 has become a predetermined value or more, the control part 17 may return the adverse-flow prevention signal to a voltage of high level so as to release the maintaining of OFF of the FET 13. Thus, a sufficient electric current flows from the drain of the FET 13 through the resistor R1 and the storage battery 4 to the drain of the FET 14 and hence in a state that adverse flow of the electric current is prevented reliably, the control part 17 can release the maintaining of OFF of the FET 13.

In order that an electric current that flows adversely from the storage battery 4 to the inductor L1 should be prevented, it may be that the predetermined value is more than the voltage outputted by the differential amplifier 15 in a case that an electric current, magnitude of which is equal to the magnitude of an electric current ripple determined by the voltage across the inductor L1 and the inductance of the inductor L1, flows through the resistor R1.

Here, as described above, the voltage outputted by the differential amplifier 15 becomes high/low in correspondence with the large/small of the output electric current that flows through the resistor R1 to the storage battery 4. Thus, the voltage outputted by the differential amplifier 15 may correspond to the value concerning the output electric current that flows through the resistor R1 and the storage battery 4 between the drain of the FET 13 and the source of the FET 14.

The value concerning the output electric current is not limited to the voltage outputted by the differential amplifier 15 and may be, for example, the electric current value of the output electric current. In this case, it may be that the predetermined value is more than a value of an electric current, magnitude of which is equal to the magnitude of an electric current ripple determined by the voltage across the inductor L1 and the inductance of the inductor L1.

Embodiment 2

Figure 6:
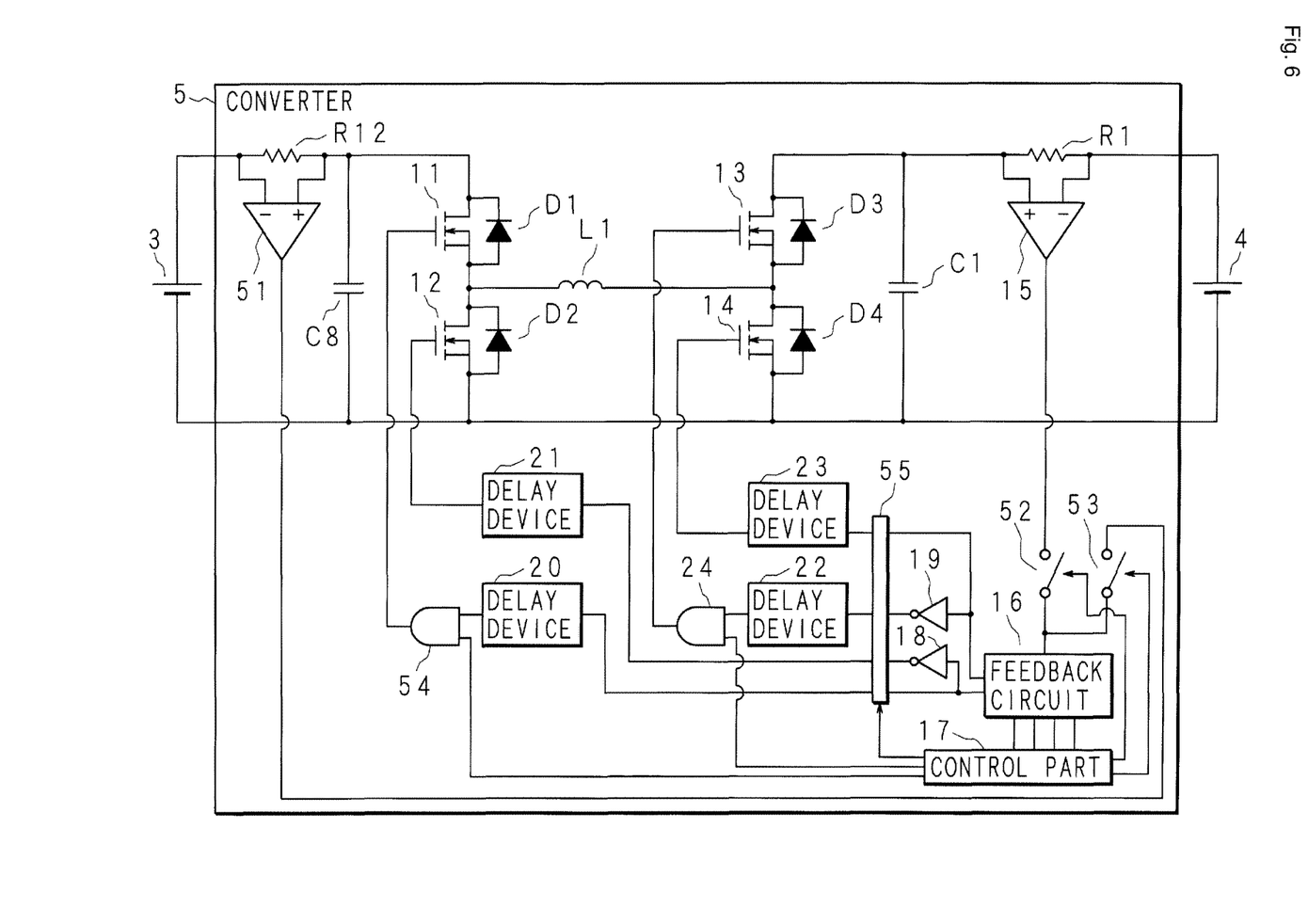
FIG. 6 is a circuit diagram of a converter according to Embodiment 2.

FIG. 6 is a circuit diagram of a converter according to Embodiment 2. Similarly to the converter 1 according to Embodiment 1, the converter 5 is connected individually to the positive terminal and the negative terminal of the battery 3 and to the positive terminal and the negative terminal of a storage battery 4. Similarly to the converter 1 according to Embodiment 1, the converter 5 converts the voltage applied by the battery 3 and then applies the converted voltage on the storage battery 4. Further, the converter 5 converts the voltage applied by the storage battery 4 and then applies the converted voltage on the battery 3.

Like configuration components in Embodiment 2 to those in Embodiment 1 are designated by like reference signs and hence their detailed description is omitted.

The converter 5 includes all configuration components constituting the converter 1 and further includes a differential amplifier 51, switches 52 and 53, an AND circuit 54, a switching circuit 55, a capacitor CS, and a resistor R12. One end of the resistor R12 is connected to the positive terminal of the battery 3 and the minus terminal of the differential amplifier 51. The other end of the resistor R12 is connected to the drain of the FET 11, the cathode of the diode D1, the plus terminal of the differential amplifier 51, and one end of the capacitor CS. The other end of the capacitor CS is connected to the negative terminal of the battery 3 and the source of the FET 12.

The output terminal of the differential amplifier 51 is connected to one end of switch 53. The other end of switch 53 is connected to one end of the switch 52 and to the feedback circuit 16. The output terminal of the differential amplifier 15 is connected to the other end of the switch 52. The two input terminals of the AND circuit 54 are connected respectively to the control part 17 and the delay device 20. The output terminal of the AND circuit 54 is connected to the gate of the FET 11.

The switching circuit 55 is provided with a first input terminal, a second input terminal, a third input terminal, and a fourth input terminal and four output terminals. The first input terminal is connected to the feedback circuit 16 and the input terminal of the inverter 19. The second input terminal is connected to the output terminal of the inverter 19. The third input terminal is connected to the output terminal of the inverter 18. The fourth input terminal is connected to the feedback circuit 16 and the input terminal of the inverter 18. The four output terminals of the switching circuit 55 are connected respectively to the delay devices 20, 21, 22, and 23.

The positive terminal of the battery 3 is connected through the resistor R12 to the drain of the FET 11 and the cathode of the diode D1. The output terminals of the differential amplifiers 15 and 51 are connected respectively through the switches 52 and 53 to the feedback circuit 16. The delay device 20 is connected through the AND circuit 54 to the gate of the FET 11.

When the voltage applied on the converter 5 by the storage battery 4 is to be converted, the capacitor C8 may smooth the voltage applied between the drain of the FET 11 and the source of the FET 12 and then may apply the smoothed voltage through the resistor R12 on the battery 3.

The voltage across the resistor R1 amplified by the differential amplifier 15 is outputted from the differential amplifier 15 to the feedback circuit 16 through the switch 52. The differential amplifier 51 amplifies the voltage across the resistor R12 and then outputs the amplified voltage through the switch 53 to the feedback circuit 16. The voltage across the resistor R12 may be proportional to the magnitude of the electric current that flows through the resistor R12 to the battery 3. Thus, the voltage outputted by the differential amplifier 51 becomes high/low in correspondence with the large/small of the output electric current that flows through the resistor R12 to the battery 3.

The switches 52 and 53 may be respectively turned ON/OFF by the control part 17. In accordance with instruction from the control part 17, the switching circuit 55 may switch connection between the four input terminals and the four output terminals.

In the AND circuit 54, a second adverse-flow prevention signal composed of voltages of high level and low level is inputted from the control part 17 to one input terminal. In the AND circuit 54, a voltage of high level or low level is inputted from the delay device 20 to the other input terminal. When the inputted second adverse-flow prevention signal is at a voltage of high level, the AND circuit 54 may output the voltage of high level or low level inputted from the delay device 20, intact through the output terminal. Further, when the inputted second adverse-flow prevention signal is at a voltage of low level, the AND circuit 54 may output a voltage of low level through the output terminal regardless of the voltage inputted from the delay device 20.

The AND circuit 54 may output a voltage of high level or low level through the output terminal to the gate of the FET 11. When the AND circuit 54 outputs a voltage of high level, in the FET 11, a voltage at or more than a predetermined voltage may be applied on the gate so that the FET 11 is turned ON. When the AND circuit 54 outputs a voltage of low level, in the FET 11, the voltage applied on the gate may become less than the predetermined voltage so that the FET 11 is turned OFF.

When the voltage applied on the converter 5 by the battery 3 is to be converted and then the converted voltage is to be applied on the storage battery 4, the control part 17 may set the switches 52 and 53 to be ON and OFF respectively and maintain at a voltage of high level the second adverse-flow prevention signal to be inputted to one input terminal of the AND circuit 54. Further, the control part 17 may instruct the switching circuit 55 to connect the first input terminal to the delay device 23, connect the second input terminal to the delay device 22, connect the third input terminal to the delay device 21, and connect the fourth input terminal to the delay device 20.

As a result, the converter 5 may operates so that adverse flow of an electric current from the storage battery 4 to the inductor L1 may be prevented and the loss in the electric power in association with voltage conversion may be small. Further, the predetermined time that elapses from the time when the control signal is switched from a voltage of high level to a voltage of low level and the maintaining of OFF of the FET 13 is started, to the time when the maintaining of OFF of the FET 13 is released is set forth suitably. Therefore, a sufficient electric current may flow from the drain of the FET 13 through the resistor R1 and the storage battery 4 to the drain of the FET 14 and hence, in a state that adverse flow of the electric current is prevented reliably, the maintaining of OFF of the FET 13 can be released.

When the voltage applied on the converter 5 by the storage battery 4 is to be converted and then the converted voltage is to be applied on the battery 3, the control part 17 may set the switches 52 and 53 to be OFF and ON respectively and sets at a voltage of high level the adverse-flow prevention signal to be inputted to one input terminal of the AND circuit 24. Then, the control part 17 may control the second adverse-flow prevention signal similarly to the adverse-flow prevention signal of a case that the voltage applied by the battery 3 is to be converted.

Further, the control part 17 may instruct the switching circuit 55 to connect the first input terminal to the delay device 21, connect the second input terminal to the delay device 20, connect the third input terminal to the delay device 23, and connect the fourth input terminal to the delay device 22.

Therefore, the FETs 11, 12, 13, and 14 and the diode D1 respectively may operate similarly to the FETs 13, 14, 11, and 12 and the diode D3 of a case that the voltage applied by the battery 3 is to be converted. Further, the resistor R12 and the differential amplifier 51 respectively may operate similarly to the resistor R1 and the differential amplifier 15 of a case that the voltage applied by the battery 3 is to be converted.

Thus, also in a case that the voltage applied by the storage battery 4 is to be converted, the converter 5 may have similar effects to those of a case that the voltage applied by the battery 3 is to be converted. Specifically, adverse flow of an electric current from the battery 3 to the inductor L1 may be prevented and the loss in the electric power in association with voltage conversion is small. The predetermined time that elapses from the time when the control signal is switched from a voltage of high level to a voltage of low level and the maintaining of OFF of the FET 11 is started, to the time when the maintaining of OFF of the FET 11 is released is set forth suitably. Therefore, a sufficient electric current flows from the drain of the FET 11 through the resistor R12 and the battery 3 to the source of the FET 12 and hence, in a state that adverse flow of the electric current is prevented reliably, the maintaining of OFF of the FET 11 can be released.

Here, also in Embodiment 2, a configuration may be employed that the control part 17 is connected further to one end of the switch 52 and the other end of switch 53 so as to detect the output voltage of any one of the differential amplifiers 15 and 51. In this configuration, in a case that the voltage applied on the converter 5 by the battery 3 is to be converted and then the converted voltage is to be applied on the storage battery 4, when the control signal has been switched from a voltage of high level to a voltage of low level and the maintaining of OFF of the FET 13 has been started and, after that, the output voltage of the differential amplifier 15 has become a predetermined value or more, the control part 17 may switch the adverse-flow prevention signal into a voltage of high level so as to release the maintaining of OFF of the FET 13. Further, in a case that the voltage applied on the converter 5 by the storage battery 4 is to be converted and then the converted voltage is to be applied on the battery 3, when the control signal has been switched from a voltage of high level to a voltage of low level and the maintaining of OFF of the FET 11 has been started and, after that, the output voltage of the differential amplifier 51 has become a predetermined value or more, the control part 17 may switch the second adverse-flow prevention signal into a voltage of high level so as to release the maintaining of OFF of the FET 11.

By virtue of this, in a state that adverse flow of the electric current is prevented reliably, the control part 17 can release the maintaining of OFF of the FET 11 or the FET 13. Here, the voltage outputted by the differential amplifier 15 may correspond to the value concerning the output electric current that flows through the resistor R1 and the storage battery 4 between the drain of the FET 13 and the source of the FET 14. The voltage outputted by the differential amplifier 51 may correspond to the value concerning the output electric current that flows through the resistor R12 and the battery 3 between the drain of the FET 11 and the source of the FET 12. Further, the value concerning the output electric current is not limited to the voltage outputted by each of the differential amplifiers 15 and 51 and may be the electric current value of the output electric current.

It is noted that in Embodiment 1, in the modification of Embodiment 1, and in Embodiment 2, in a case that the voltage applied by the battery 3 is to be converted, when the control part 17 sets the control signal at a voltage of high level so as to stop voltage conversion, it is sufficient that at least the FETs 11 and 13 are turned OFF. That is, the FET 14 need not be turned OFF. Similarly, in a case that the voltage applied by the storage battery 4 is to be converted, when the control part 17 sets the control signal at a voltage of high level so as to stop voltage conversion, it is sufficient that at least the FETs 11 and 13 are turned OFF. That is, the FET 12 need not be turned OFF.

Further, ON/OFF of the FETs 11 and 12 and ON/OFF of the FETs 13 and 14 need not be synchronized with each other. In the converter 1 according to Embodiment 1 or according to the modification of Embodiment 1, in a case that the FETs 11 and 12 are turned ON/OFF complementarily, regardless of the ON/OFF states of the FETs 13 and 14, the voltage applied on the converter 1 by the battery 3 can be stepped down. Further, in a case that the FETs 13 and 14 are turned ON/OFF complementarily, regardless of the ON/OFF states of the FETs 11 and 12, the voltage applied on the converter 1 by the battery 3 can be stepped up. In the converter 5 according to Embodiment 2, in a case that the voltage applied by the battery 3 is to be converted, similar description to that of the converter 1 is adoptable. In a case that the voltage applied by the storage battery 4 is to be converted, when the FETs 13 and 14 are turned ON/OFF complementarily, regardless of the ON/OFF state of the FETs 11 and 12, the voltage applied by the storage battery 4 can be stepped down. Further, when the FETs 11 and 12 are turned ON/OFF complementarily, regardless of ON/OFF state of the FETs 13 and 14, the voltage applied by the storage battery 4 can be stepped up.

Further, it is sufficient that the FETs 11, 12, 13, and 14 serve as switches alone. Thus, employable FETs are not limited to those of N-channel type and may be FETs of P-channel type. Further, bipolar transistors may be employed in place of the FETs 11, 12, 13, and 14. Further, the diodes D1, D2, D3, and D4 are not limited to parasitic diodes. Furthermore, the triangular waves W1 and W2 outputted from the control part 17 are not limited to sawtooth waves.

Embodiment 1, the modification of Embodiment 1, and Embodiment 2 having been disclosed shall be regarded as illustrative and not restrictive. The scope of the present invention is set forth by the claims not by the description given above. All modifications within the scope and the spirit of the claims shall be incorporated.

REFERENCE SIGNS LIST 1, 5 Converter
11 FET (corresponding to first switch or third switch)
12 FET (corresponding to second switch or fourth switch)
13 FET (corresponding to third switch or first switch)
14 FET (corresponding to fourth switch or second switch)
16 Feedback circuit (corresponding to generating device)
17 Control part (corresponding to maintaining device and release device)
D1, D3 Diode
L1 Inductor

The invention claimed is:
1. A converter comprising:
an inductor;
a first switch;
a second switch,
wherein one end of each of the first switch and the second switch is connected to one end of the inductor;
a third switch,
wherein one end of the third switch is connected to the other end of the inductor;
a fourth switch connected between the other ends of the inductor and the second switch,
wherein the converter is adapted to turn ON/OFF individually the first switch, the second switch, the third switch and the fourth switch so as to convert a voltage applied between the other ends of the first switch and the second switch;
a diode having an anode and a cathode, the anode and the cathode being connected respectively to one end and the other end of the third switch;
a maintaining device adapted to maintain the third switch at OFF after transition has occurred from a state that the first switch and the third switch are OFF to a state that a ON/OFF switching of the first switch is allowable and the third switch is OFF;
a generating device adapted to turn, during the time that the maintaining device maintains the third switch at OFF, ON/OFF individually the first switch, the second switch and the fourth switch so as to generate an output electric current that flows between the other end of the third switch and the second-switch-side one end of the fourth switch; and
a release device for releasing, after the generating device has generated the electric current, the maintaining of OFF of the third switch performed by the maintaining device,
wherein the generating device includes:
a semiconductor transistor having a first end, a second end, and a third end, a resistance between the first end and the second end becoming small/large in correspondence with high/low of a voltage applied on the third end;
a resistor provided on a pathway of an electric current flowing from the second end; and
a capacitor, one end of which is connected to the third end,
wherein a constant voltage is applied on the first end,
wherein the generating device generates small/large output electric current in correspondence with high/low of a voltage of a connection node between the semiconductor transistor and the resistor, and increases the output electric current by switching a voltage applied on the third end from a first voltage to a second voltage lower than the first voltage.

2. The converter according to claim 1, wherein the release device releases the maintaining of OFF when a predetermined time has elapsed since the maintaining device has started the maintaining.

3. The converter according to claim 2, wherein the timing of switching of the ON/OFF of the first switch and the second switch is adjusted so that no time period is present that the first switch and the second switch are both ON.

4. The converter according to claim 1, wherein
the release device releases the maintaining of OFF when a value concerning the output electric current becomes more than or equal to a predetermined value.

5. The converter according to claim 4, wherein the timing of switching of the ON/OFF of the first switch and the second switch is adjusted so that no time period is present that the first switch and the second switch are both ON.

6. The converter according to claim 1, wherein the timing of switching of the ON/OFF of the first switch and the second switch is adjusted so that no time period is present that the first switch and the second switch are both ON.

7. The converter according to claim 1, wherein the first, second, third and fourth switches are N-channel type field effect transistors.

8. The converter according to claim 1, wherein the first, second, third and fourth switches are P-channel type field effect transistors.

* * * * *